United States Patent
Bardin et al.

(10) Patent No.: US 11,214,719 B2
(45) Date of Patent: Jan. 4, 2022

(54) ANTI-DUST ADDITIVE COMPOSITION FOR CONSTRUCTION MATERIAL

(71) Applicant: TOTAL MARKETING SERVICES, Puteaux (FR)

(72) Inventors: Franck Bardin, Chambourcy (FR); Thorsten Bauer, Ibbenbüren (DE); Antoine Westelynck, Brueil en Vexin (FR); Achim Wiessler, Karlsbad (DE)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 15/520,700

(22) PCT Filed: Nov. 18, 2015

(86) PCT No.: PCT/EP2015/076957
§ 371 (c)(1),
(2) Date: Apr. 20, 2017

(87) PCT Pub. No.: WO2016/079176
PCT Pub. Date: May 26, 2016

(65) Prior Publication Data
US 2017/0313922 A1    Nov. 2, 2017

(30) Foreign Application Priority Data
Nov. 18, 2014    (EP) .................................. 14306833

(51) Int. Cl.
*C09K 3/22*         (2006.01)
*C04B 40/00*        (2006.01)
*C04B 103/00*       (2006.01)
*C04B 111/00*       (2006.01)

(52) U.S. Cl.
CPC ............ *C09K 3/22* (2013.01); *C04B 40/0039* (2013.01); *C04B 40/0042* (2013.01); *C04B 2103/0075* (2013.01); *C04B 2111/00637* (2013.01); *C04B 2111/00646* (2013.01)

(58) Field of Classification Search
CPC ... C04B 2103/0075; C04B 2111/00646; C04B 40/0042; C09K 3/22
See application file for complete search history.

(56) References Cited

U.S. PATENT DOCUMENTS

| | | | |
|---|---|---|---|
| 4,586,690 A | 5/1986 | Hartel et al. | |
| 5,104,418 A | 4/1992 | Genova et al. | |
| 5,259,851 A * | 11/1993 | Genova ................... | C10L 1/328 44/302 |
| 5,412,007 A | 5/1995 | Hendrix et al. | |
| 6,406,538 B1 | 6/2002 | Laudet et al. | |
| 8,262,793 B2 | 9/2012 | Stohr et al. | |
| 9,388,079 B2 | 7/2016 | Langford | |
| 2004/0149627 A1* | 8/2004 | Koide ....................... | C10L 1/04 208/15 |
| 2006/0162237 A1* | 7/2006 | Mullay ............... | B01F 17/0085 44/301 |
| 2010/0279573 A1 | 11/2010 | Sinnige | |
| 2012/0010109 A1* | 1/2012 | Westelynck ............ | C09K 8/34 507/137 |
| 2012/0156759 A1 | 6/2012 | Fritzmeier et al. | |
| 2012/0180741 A1* | 7/2012 | Strey ....................... | C10L 1/328 123/1 A |
| 2016/0304399 A1 | 10/2016 | Kuryatnyk et al. | |

FOREIGN PATENT DOCUMENTS

| | | | | |
|---|---|---|---|---|
| JP | H0558695 A | | 3/1993 | |
| JP | H08-081249 A | | 3/1996 | |
| WO | WO1997034969 | * | 9/1997 | ................ C10L 1/32 |
| WO | WO-02092731 A1 | * | 11/2002 | ............. C10L 1/328 |
| WO | WO-2011/038426 A2 | | 3/2011 | |

* cited by examiner

*Primary Examiner* — Shuangyi Abu Ali
(74) *Attorney, Agent, or Firm* — Harness, Dickey & Pierce, PLC

(57) ABSTRACT

An anti-dust additive composition for industrial mortars, dry coatings, cements and tile adhesives, includes at least a hydrocarbon fluid, a surfactant and 0.01% to 5% wt of water, preferably from 0.01% to 2% wt, more preferably from 0.01% to 1% wt and even more preferably from 0.05% to 0.5% wt of water. A process of preparation of construction material includes the step of adding the anti-dust additive composition to a material powdery binder. The use of the anti-dust additive composition for decreasing the dust emission during the fabrication of construction material with a material powdery binder and/or during the use of the construction material is also disclosed.

14 Claims, No Drawings

ANTI-DUST ADDITIVE COMPOSITION FOR CONSTRUCTION MATERIAL

CROSS-REFERENCE TO RELATED APPLICATIONS

This application is a National Phase Entry of International Patent Application No. PCT/EP2015/076957, filed on Nov. 18, 2015, which claims priority to French Patent Application Serial No. 14306833.6, filed on Nov. 18, 2014, both of which are incorporated by reference herein.

TECHNICAL FIELD

The invention relates to an anti-dust additive composition for construction material powdery binder, process of preparation of the construction material powdery binder comprising the anti-dust additive composition and the use of thereof.

BACKGROUND

Mortar, coatings or cement compositions in the form of dry powder ready for use have been known for a long time, comprising at least one powdery binder and at least one aggregate, as well as possibly at least one standard additive and/or adjuvant, and formed from particles, at least some of which, referred to as fine particles, are liable to produce an emission of dust. This type of composition, generally referred to "industrial" mortar, is a mortar batched and mixed in the factory. It is "dry", that is to say ready to be mixed with water. Amongst the aforementioned binders, mineral binders can be cited, such as slaked lime, cements, gypsum render/plaster or the like, and organic binders, such as for example certain synthetic resins. As aggregates (sometimes referred to as agglomerates), sand, stone powder, crushed brick or the like can be mentioned.

The expression mortar means all compositions meeting the particularities given above and therefore also renders/plasters. "Render/plaster coat" means a layer applied in one or more passes using the same mortar, without leaving the first pass to dry before applying the second. Then the "undercoat" or sub-layer coat is distinguished, namely the "bottom layer or layers of a system", of the "final coat" or facade coat or finishing coat; namely the "top layer of a multi-coat system". The aforementioned industrial mortars and ready dry renders/plasters have the well-known long-standing drawback of high emission of dust both during manufacture by mixing their constituent components, during bagging and during manipulation before mixing on the site of use.

This emission of dust is the subject of regulation on the protection of workers, which is continually being strengthened. Moreover, the aforementioned emission of dust gives rise to a degradation of the local environment, in the factory and on the site, requiring particularly constraining cleaning and protection work. The problem of the emission of dust is particularly critical during work in a closed habitat, in particular during renovation of inhabited interiors.

Finally, the emission of dust will mainly concern the fractions of mortars and renders/plasters having the finest particles, which are often the low-content adjuvant. These constituents are in general the most critical and the most expensive in the formulation; if they partially get into the atmosphere in the factory and/or on the site this may lead to an imbalance in the composition of the mortar and therefore to a loss of performance.

In any other field, it is known how to reduce the emission of dust emitted during the treatment of soil with quicklime, by the agglomeration of the lime fines by means of a non-aqueous fluid additive (EP 0880569 B2). The addition, to the mortars and renders/plasters, of polar organic liquids, in particular functionalised polyolefins having for example carboxylic functions or any other equivalent function (alcoholic or phenolic), is known so as to improve the adhesion and workability of the compositions, for the purpose of limiting the addition of water during mixing (reduction in the water/binder ratio) (JP 08081249, JP 05058695, and U.S. Pat. No. 4,586,960). It should however be noted that in no cases have such polar compounds been deemed to reduce the emission of dust from the compositions to which they have been added.

"Workability" means all the properties of use of a mortar that confer on its suitability for use. This concept is also sometimes referred to as "plasticity".

Hydrocarbon fluids find widespread use as solvents such as in adhesives, cleaning fluids, explosives solvents, for decorative coatings and printing inks, light oils for use in applications such as metal extraction, metalworking or demoulding and industrial lubricants, and drilling fluids. The hydrocarbon fluids can also be used as extender oils in adhesives and sealant systems such as silicone sealants and as viscosity depressants in plasticised polyvinyl chloride formulations and as carrier in polymer formulation used as flocculants for example in water treatment, mining operations or paper manufacturing and also used as thickener for printing pastes. Hydrocarbon fluids may also be used as solvents in a wide variety of other applications such as chemical reactions.

The chemical nature and composition of hydrocarbon fluids varies considerably according to the use to which the fluid is to be put. Important properties of hydrocarbon fluids are the distillation range generally determined by ASTM D-86 or the ASTM D-1160 vacuum distillation technique used for heavier materials, flash point, density, aniline point as determined by ASTM D-611, aromatic content, sulphur content, viscosity, colour and refractive index. Fluids can be classified as paraffinic, isoparaffinic, dearomatised, naphthenic, non-dearomatised and aromatic.

The object of the invention is to propose an efficient anti-dust additive composition and involve good mechanical properties of construction material powdery binder including the said anti-dust additive composition. There is also a need of a biodegradable product which matches all the legislation restrictions for volatile organic compounds (VOC) and with all the mechanical properties of the final product destination.

One of the principal aims of the invention is to provide a composition of additive usable as dust-binder in construction material. Another aim of the invention is to provide an additive composition usable as anti-dust additive in cement, mortar, dry coatings, and tile adhesives. Especially, the aim of the invention is to reduce dust emission during manufacture of mortars, coatings and cement compositions, all in the form of dry powder, during the step of mixing their constituent components, or during bagging or during manipulation before mixing on the site of use. Another aim of the invention is to provide an anti-dust additive composition without volatile organic compounds (VOC). Another aim of the invention is to provide an anti-dust additive composition which allows good mechanicals properties for construction materials. Another aim of the invention is to provide an anti-dust additive composition in which all the substances composing the product are readily or inherently biodegradable according to OECD tests. Furthermore the invention has for objective to allow the preparation of construction material with the anti-dust additive composition that emits maximum 750 μg/m$^3$ of VOC after 3 days, maximum 60 μg/m$^3$ of VOC after 28 days according to GEV EMICODE evaluation and fully complies with the Blue Angel certification for products and services that have environmentally friendly aspects.

SUMMARY

These aims are reached by a new type of anti-dust additive composition. The invention provides an anti-dust additive composition for industrial mortars, dry coatings, cements and tile adhesives, comprising at least a hydrocarbon fluid, a surfactant and 0.01% to 5% wt of water, preferably from 0.01% to 2% wt, more preferably from 0.01% to 1% wt and even more preferably from 0.05% to 0.5% wt of water.

Preferably the hydrocarbon fluid according to the invention is selected from the group consisting of hydrotreated hydrockracked hydrocarbon fluids and hydrotreated hydrodewaxed hydrocarbon fluids, alone or in combination. Preferably the hydrocarbon fluid according to the invention comprises at least one hydrotreated hydrodewaxed hydrocarbon fluid. Preferably the hydrocarbon fluid according to the invention is a dearomatised and/or desulfurized hydrocarbon fluid. Preferably the hydrocarbon fluid according to the invention is originated from crude oil and/or biomass.

Preferably the hydrocarbon fluid according to the invention has a distillation range comprised between 230° C. and 410° C., preferably between 250° C. and 400° C. and more preferably between 280° C. and 400° C. according to ASTM D86. In one embodiment, the hydrocarbon fluid according to the invention has an initial boiling point of about 300° C. and a final boiling point of about 380° C. according to ASTM D86. Preferably the hydrocarbon fluid according to the invention has a kinematic viscosity at 40° C. comprised between 2 and 22 mm$^2$/s, more preferably between 2 and 15 mm$^2$/s and even more preferably between 3 and 14 mm$^2$/s according to ASTM D445. Preferably the hydrocarbon fluid according to the invention contains less than 0.1% wt of aromatics, preferably less than 800 ppm, even more preferably less than 600 ppm measured by UV spectrometry.

Preferably the hydrocarbon fluid according to the invention has:
- a naphthenic content below 50% wt, especially below 40% wt and even below 30% wt, and/or
- a paraffinic content above 60% wt, especially above 65% wt and even above 70% wt, and/or
- an isoparaffinic content above 50% wt, and a normal paraffinic content below 20% wt.

Preferably the surfactants according to the invention are nonionic surfactants. Preferably the nonionic surfactants are selected from the group consisting of sorbitan oleate, triblock copolymers derived from ethylene oxide and propylene oxide, fatty alcohol and ethylene oxide condensate on fatty acids, alone or in combination. According to one preferred embodiment, the anti-dust additive composition comprises 95% to 99% wt of hydrocarbon fluid. According to one preferred embodiment, the anti-dust additive composition comprises between 0.1% to 10% wt of one or more surfactants, more preferably between 0.5% to 5% wt.

Another object of the invention is a preparation process of construction material comprising the step of adding the anti-dust additive composition according to the invention to a material powdery binder. Preferably according to the process of the invention the anti-dust additive composition is added by vaporisation on a material powdery binder. Preferably according to the process of the invention the anti-dust additive composition is added by blending with a material powdery binder.

Preferably according to the process of the invention, the construction material comprises between 0.01% and 10% wt of the anti-dust additive composition, preferably between 0.05% and 5% wt, more preferably between 0.1% and 2% wt, even more preferably between 0.2% and 1% wt. The invention also relates to the use of the anti-dust additive composition according to the invention for decreasing the dust emission during the fabrication of construction material with material powdery binder and/or during the use of said construction material. Preferably the material powdery binder is selected from the group consisting of industrial mortars, dry coatings, cements and tile adhesives.

DETAILED DESCRIPTION

The additive according to the invention concerns a dust-binder additive composition which presents very good anti-dust properties. The anti-dust additive composition for industrial mortars, dry coatings, cements, and tile adhesives according to the invention comprises at least a hydrocarbon fluid, a surfactant and 0.01% to 5% wt of water, preferably from 0.01% to 2% wt, more preferably from 0.01% to 1% wt and even more preferably from 0.05% to 0.5% wt of water.

Hydrocarbon fluid by means of the invention refers to a hydrocarbon cut from the distillation of crude oil, preferably from atmospheric distillation and/or vacuum distillation of crude oil, preferably from atmospheric distillation followed by vacuum distillation. The hydrocarbon fluid of the invention is also preferably subjected to hydrotreatment, catalytic cracking or hydrocracking. The hydrocarbon fluid of the invention is also preferably subjected to the steps of dearomatization and desulfurization optionally. The hydrocarbon fluid of the invention can also preferably be subjected to a hydrodewaxing step.

Preferably, the hydrocarbon cut obtained after the distillation of crude oil is a diesel fuel. This diesel fuel is subjected to hydrocracking or catalytic cracking, hydrodewaxing, hydrotreatment steps, optionally followed by dearomatization and desulfurization steps. The hydrocarbon fluid may be a mixture of hydrocarbon fluids subjected to the steps described above.

The hydrocarbon fluid according to the invention can also refer to a cut originated from biological origin or in other words from biomass. By hydrocarbon fluid from biological origin the applicant means a hydrocarbon fluid produced from biological raw materials from the group consisting of vegetable oils, animal fats, fish oils, and mixtures thereof. Suitable biological raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials.

The hydrocarbon fluid from biological origin is then produced by using for instance a process first comprising a hydrodeoxygenation (HDO) step for decomposing the structure of the biological ester or triglyceride constituent, and for removing oxygen, phosphorus and sulfur compounds, concurrently hydrogenating the olefinic bonds, followed by isomerization of the product thus obtained, thus branching the hydrocarbon chain and improving the low temperature properties of the paraffin. The product may for instance be fractionated to give the desired fractions. The desired fractions are then subjected to hydrotreatement and distillation to obtain the desired hydrocarbon fluid specifications according to the invention.

The hydrocarbon fluid may be a mixture of hydrocarbon fluids originated from crude oil and/or from biomass. Preferably the hydrocarbon fluid is a dearomatised and/or desulfurized hydrocarbon fluid. Preferably the hydrocarbon fluid is selected from the group consisting of hydrotreated hydrockracked hydrocarbon fluid and hydrotreated hydrodewaxed hydrocarbon fluid, alone or in combination. Preferably the anti-dust additive composition comprises at least one hydrotreated hydrodewaxed hydrocarbon fluid.

The hydrocarbon fluid as described above has preferably a distillation range comprised between 230° C. and 410° C., preferably between 250° C. and 400° C. and more preferably between 280° C. and 400° C. according to ASTM D86. The hydrocarbon fluid may comprise one or more fractions of distillation ranges included in the said fraction. The hydrocarbon fraction according to the invention has preferably a carbon range comprised between C12 and C29 atoms of carbon and preferably between C13 and C27 atoms of carbon according to ASTM D2887.

The hydrocarbon fluid of the invention comprises advantageously more than 60% wt of paraffinic compounds, preferably more than 65% wt, even more preferably more than 70% wt determined by GCxGC analyses. The hydrocarbon fluid according to the invention consists advantageously of a majority of isoparaffin and a minority of normal paraffin. Preferably the hydrocarbon fraction contains more than 50% wt of isoparaffin and less than 20% wt of normal paraffin determined by GC-MS analyses. The hydrocarbon fraction of the invention comprises preferably less than 50% wt of naphthenic compounds, preferably less than 40% wt, even more preferably less than 30% wt determined by GCxGC analyses. The hydrocarbon fluid of the invention comprises preferably less than 20% wt of polynaphthenic compounds, preferably less than 10% wt, even more preferably less than 5% wt determined by GCxGC analyses.

The hydrocarbon fluid according to the invention contains very low aromatics content. By very low the applicant means a hydrocarbon fluid comprising less than 0.1% wt of aromatics, preferably less than 800 ppm, even more preferably less than 600 ppm measured by UV spectrometry. The hydrocarbon fluid according to the invention is preferably free of benzenic compounds. By free the applicant means a hydrocarbon fluid comprising less than 10 ppm of benzenic compounds and more preferably less than 1 ppm according to ASTM D6229.

Preferably the hydrocarbon fluid according to the invention has a sulfur content below 10 ppm and more preferably less than 2 ppm according to ASTM D5453. The hydrocarbon fluid according to the invention has preferably a kinematic viscosity at 40° C. comprised between 2 and 22 mm$^2$/s, preferably between 2 and 15 mm$^2$/s and more preferably between 3 and 14 mm$^2$/s according to ASTM D445. The hydrocarbon fluid of the invention has a pour point according to ASTM D97 between −50 and +10° C., preferably between −45 and 0° C. The hydrocarbon fluid according to the invention also has the advantage of being readily available on the market and to be relatively economical in the product chain of oil distillation. The amount of hydrocarbon fluid in the anti-dust additive composition according to the invention is preferably comprised between 95 to 99% wt.

The anti-dust additive composition according to the invention comprises also at least one surfactant. Surfactants are compounds that lower the surface tension (or interfacial tension) between two liquids or between a liquid and a solid. Preferably the surfactant according to the invention is biodegradable. The surfactant used in the anti-dust additive composition is preferably a nonionic surfactant. Preferably the surfactant is selected from the group consisting of sorbitan oleate, triblock copolymers derived from ethylene oxide and propylene oxide, fatty alcohol and ethylene oxide condensate on fatty acids, alone or in combination. The amount of surfactant in the anti-dust additive composition according to the invention is preferably comprised between 0.1% to 10% wt of one or more surfactants, more preferably between 0.5% to 5% wt.

The anti-dust additive composition according to the invention also comprises water. The presence of water in the additive according to the invention preserves a clear and transparent product. The amount of water in the additive is essential to lead to a stable formulation. Without water an unclear composition is formed with a precipitation of the additives which leads to the separation in two phases of the anti-dust additive composition. The amount of water in the additive according to the invention is preferably comprised between 0.01% to 5% wt, preferably between 0.01% to 2% wt, more preferably between 0.01% to 1% wt and even more preferably between 0.05% to 0.5% wt.

The anti-dust additive composition according to the invention is free of volatile organic compounds (VOC). According to one preferred embodiment, the emissions of VOC of a tile adhesive formulated with the anti-dust additive composition according to the invention complies with the requirements of Blue Angel RAL-UZ113 and GEV EMICODE (level EC1+). In particular, the anti-dust additive composition fully respects the Blue Angel certification for products and services that have environmentally friendly aspects. The anti-dust additive composition according to the invention complies with the Blue Angel RAL-UZ 113 "Basic Criteria for Award of the Environmental Label—Low-Emission Floor Covering Adhesives and other Installation Materials": it respects all the requirements about exclusion of substances and preparations.

Preparations of construction material are well known. In particular, material powdery binders as construction materials are prepared according to all known processes. According to one preferred embodiment of the invention, the process of preparation of construction material comprises the step of adding an anti-dust additive composition to a material powdery binder. Preferably the anti-dust additive composition according to the process of the invention and to one preferred embodiment is added by blending with a material powdery binder or by vaporisation on a material powdery binder. Preferably the construction material prepared according to the process of the invention comprises between 0.01% and 10% wt of the anti-dust additive composition, preferably between 0.05% and 5% wt, more preferably between 0.1% and 2% wt, even more preferably between 0.2% and 1% wt.

The anti-dust additive composition according to the invention is used for decreasing the dust emission during the fabrication of construction material with material powdery binder and/or during the use of said construction material. Preferably, the anti-dust additive composition according to the invention is used for decreasing the dust emission during fabrication of industrial mortars, dry coatings, cements and tile adhesives. Especially, the invention allows reducing the dust emission during the step of mixing the material powdery binder with the other constituents of a tile adhesive, such as water.

EXAMPLES

In the following description, the examples illustrate the invention without limiting it. Different formulations of dust binder containing hydrocarbon fluids, surfactants and water in emulsion have been evaluated.

The following examples describe the anti-dust additive compositions comprising:
- the hydrocarbon fluid HYDROSEAL G340H commercialised by the society TOTAL FLUIDS (hydrotreated hydrodewaxed hydrocarbon fluid) and/or,
- the hydrocarbon fluid HYDROSEAL G400H commercialised by the society TOTAL FLUIDS (hydrotreated hydrocracked hydrocarbon fluid) and/or,
- the hydrocarbon fluid NEXBASE 3030 (catalytically hydroisomerized and dewaxed base oil) and,
- a combination of Polioxol 5106, Span 80, Clariant Emulsogen MTP 070 or Croda Synperonic PE/31 surfactants (nonionic surfactants),
- and water.

The Table 1 indicates the mains characteristics of each hydrocarbon fluid according to the example.

TABLE 1

| Parameters | Hydroseal G340H | Hydroseal G400H | 75% Hydroseal G340H/25% Hydroseal G400H | Nexbase 3030 |
|---|---|---|---|---|
| Initial boiling point, (° C.) [ASTM D86] | 330 | 304 | 314 | 302 |
| Final boiling point, (° C.) [ASTM D86] | 380 | 347 | 373 | 368 |
| Kinematic viscosity at 40° C., (mm$^2$/s) [ASTM D445] | 10.3 | 6 | 8.7 | 12 |
| Pour point (° C.) [ASTM D97] | −35 | −2 | −15 | −30 |
| Aromatic (ppm) [UV spectrometry] | 57 | 80 | 61 | 420 |
| Naphthenic (%) [GC2D] | 24.7 | 24.0 | 24.3 | 27 |
| Paraffinic (%) [GC2D] | 74.3 | 76.0 | 74.7 | 73 |
| N-paraffin (%) [GC2D] | 0.1 | 16.0 | 4.1 | — |
| Isoparaffin (%) [GCMS] | 74.2 | 60.0 | 70.6 | — |
| Sulphur (ppm) [ASTM D5453] | <2 | <2 | <2 | <1 |
| Benzenes (ppm) [ASTM D6229] | <10 | <10 | <10 | <10 |

The table 2 shows the different anti-dust additive compositions.

TABLE 2

| Raw material | Anti-dust 1 % | Anti-dust 2 % | Anti-dust 3 % | Anti-dust 4 % | Anti-dust 5 % |
|---|---|---|---|---|---|
| HYDROSEAL G340H | 96.90 | 72.68 | — | 72.68 | 100 |
| HYDROSEAL G400H | — | 24.22 | — | 24.22 | — |
| NEXBASE 3030 | — | — | 96.90 | — | — |
| Polioxol 5106 | 2.55 | 2.55 | 2.55 | — | — |
| Span 80 | 0.45 | 0.45 | 0.45 | — | — |
| Clariant Emulsogen MTP 070 | — | — | — | 2.80 | — |
| Croda Synperonic PE/31 | — | — | — | 0.20 | — |
| Water | 0.10 | 0.10 | 0.10 | 0.10 | — |

The table 3 shows the mortar composition used for the tile adhesive. The mortar is a REDI Fliesenkleber Extra-Flex dry mortar. It is a Class C2 TE dry mortar (according to EN 12004).

TABLE 3

| Raw material | % |
|---|---|
| Silica Sand (0-0.3 mm) | 32.1 |
| Filler (Calcium Carbonate) | 17.7 |
| Portland cement CEM I 42.5 R | 40.0 |
| Dispersion Powder (Polyvinylacetate-Copolymerisat) | 4.5 |
| Celluloseether | 0.5 |
| Pulverized Fly ash | 3.0 |
| Microsilica (Amorphous silicon dioxide powder) | 2.0 |
| Thixotropic Agent (Layered silicate) | 0.05 |
| Bentonite | 0.15 |

The table 4 indicates the different tile Adhesive formulations corresponding to tables 1, 2 and 3.

TABLE 4

| | Tile adhesive | | | | | |
|---|---|---|---|---|---|---|
| Raw material | A % | B % | C % | D % | E % | F % |
| Dry mortar | 100 | 99.50 | 99.50 | 99.50 | 99.50 | 99.50 |
| Anti-dust 1 | | 0.50 | | | | |
| Anti-dust 2 | | | 0.50 | | | |
| Anti-dust 3 | | | | 0.50 | | |
| Anti-dust 4 | | | | | 0.50 | |
| Anti-dust 5 | | | | | | 0.50 |

The table 5 shows the mechanical properties tested for each of the tile adhesives of table 4.

TABLE 5

| | Tile Adhesive | | | | | |
|---|---|---|---|---|---|---|
| | A | B | C | D | E | F |
| Particle size distribution (DIN EN 1015-1) | | | | | | |
| <0.090 mm | 63.4 | 62.5 | 60.4 | 60.0 | 61.3 | 60.9 |
| >0.090 mm and <0.500 mm | 36.5 | 37.3 | 39.4 | 39.9 | 38.5 | 38.9 |
| >0.500 mm | 0.1 | 0.2 | 0.2 | 0.1 | 0.2 | 0.2 |
| >1.000 mm | 0.0 | 0.0 | 0.0 | 0.0 | 0.0 | 0.0 |
| Ashing (Weight loss [%]) | | | | | | |
| 3 hours at 105° C. | 0.09 | 0.18 | 0.16 | 0.16 | 0.17 | 0.16 |
| 3 hours at 450° C. | 3.35 | 3.88 | 4.04 | 3.76 | 3.91 | 3.81 |

TABLE 5-continued

| | Tile Adhesive | | | | | |
|---|---|---|---|---|---|---|
| | A | B | C | D | E | F |
| Slipping Test 200 g Tile (DIN EN 1308) | | | | | | |
| [mm] | 0.0 | 0.0 | 0.0 | 0.0 | 0.0 | 0.0 |
| Density of Green mortar (DIN EN 1015-6) | | | | | | |
| [kg/dm$^3$] | 1.535 | 1.589 | 1.523 | 1.544 | 1.541 | 1.538 |
| Tensile strength (DIN EN 1348) after 28 days | | | | | | |
| [N/mm$^2$] | 1.87 | 1.82 | 1.87 | 1.97 | 1.93 | 1.60 |
| Tensile strength with longer open time 30 min. (DIN EN 1348) after 28 days | | | | | | |
| [N/mm$^2$] | 0.74 | 0.61 | 0.82 | 0.92 | 0.70 | 0.61 |
| Tensile strength (DIN EN 1348) after 7 days dry storage and 21 days water immersion | | | | | | |
| [N/mm$^2$] | unknown | 0.91 | 0.99 | 0.97 | 0.94 | 0.59 |

The results of table 5 show that the anti-dust additive composition according to the invention has no negative impacts on the mechanical properties of the tile adhesives (tile adhesives B, C, D and E). In the contrary, the tile adhesive containing only hydrocarbons fluids (tile adhesive F) presents non acceptable mechanical properties, as shown in Table 5. This reference with a pure Hydrocarbon as anti-dust additive composition has a significant lower tensile strength according to DIN EN 1348 which leads to an unusable tile adhesive.

The tables 6 and 7 indicate the dust emission evaluation for the tile adhesives tested. The table 6 shows the anti-dust performance of the tile adhesives according to Dust Mon L Machine from Microtrac commonly used by producers. The table 7 shows the anti-dust efficiency according to the French standard NF P 94-103 modified.

Table 6: Dust Mon L Machine: The DustMon L consists of a dosing system which is detachable and easy to snap in and out of the instrument body, sample collector, LED light source and detector. It offers a wide measurement from high-dust level products to low-dust products. The sample is filled into the sample beaker. After starting the measurement the valve opens and the sample drops down through the tube into the sample box. The dust of the sample will rise into the measurement area between the light source and the detector. Depending on the concentration of dust the light intensity will decrease. This is a direct indication for the amount of dust in the sample. Already during the ongoing analyses the DustMon L software is showing the progress of the dust sedimentation. After 30 seconds the analysis is completed all data can be viewed such as: maximum dust concentration (0-100 of complete dust concentration), end value, dust index (maximum value after 30 seconds), particle size distribution of the dust fraction.

The column dust is an index for the spontaneity of the dust formation. A smaller value means a lower dust formation at the beginning. The dust area is a value for the total formation during the test duration of 30 seconds. A smaller value means less dust in total.

TABLE 6

| Tile Adhesives | Dust | Dust Area |
|---|---|---|
| A | 69.4 | 756.1 |
| B | 26.9 | 201.6 |
| C | 17.9 | 133.9 |
| D | 22.5 | 157.1 |
| E | 23.4 | 175.5 |
| F | 17.8 | 146.3 |

Table 6 results show that dust is reduced from 3 to 4 times in the tile adhesives containing the anti-dust additive compositions (tile adhesives B to E) comparing to cement alone in formulation A. The NF 94-103 standard allows the determination of the dust emission rate of the evaluated tile adhesive composition. For this evaluation the standard has been slightly modified in order to better discriminate the dust emission of each tile adhesive. The tests have been performed under the operate mode of NF P 94-103 with the following modifications: depression of 2.76 hPA instead of 5.52 hPa (32+2 mn of liquid and d=0.88) and 3 minutes of aspiration instead of 4 minutes. This evaluation shows the percentage of volatile product for each tile adhesive tested (dust emission).

TABLE 7

| Tile Adhesives | Result (%) |
|---|---|
| A | 53.7 |
| B | 33.6 |
| C | 30.7 |
| D | 36.0 |
| E | 27.0 |
| F | 24.0 |

Table 7 confirms that the dust emissions are reduced by almost 2. Tile adhesive E with anti dust additive composition 4 composed of the hydrocarbon fluids mixed shows the best result in term of mechanicals properties and dust reduction. Tile adhesive F with hydrocarbon fluid alone (anti-dust additive composition 5) shows good dust reduction results but non-acceptable mechanical properties with a significant lower tensile strength.

Table 8 indicates the evaluation of the emissions of volatile organic compounds (VOC) according to ISO 16000-3, ISO 16000-6, ISO 16000-9 and ISO 16000-11 of the GEV EMICODE requirements for the tile adhesive E which shows the best results in terms of mechanical properties and dust reduction.

TABLE 8

| Parameter | Concentration µg/m$^3$ | EC2 µg/m$^3$ | EC1 µg/m$^3$ | EC1 Plus µg/m$^3$ |
|---|---|---|---|---|
| Total VOC after 3 days | 170 | ≤3000 | ≤1000 | ≤750 |
| Total VOC after 28 days | 26 | ≤300 | ≤100 | ≤60 |
| Total Semi VOC after 3 days | <5 | ≤100 | ≤50 | ≤40 |
| Total VOC without LCI * after 28 days | 26 | | >40 | ≤40 |
| R-value (dimensionless) after 28 days | 0.0073 | | >1 | ≤1 |
| Formaldehyde after 3 days | <3 | | ≤50 | |
| Acetaldehyde after 3 days | 23 | | ≤50 | |
| Sum Formaldehyde + Acetaldehyde after 3 days (ppm) | 0.013 | | ≤0.05 | |

TABLE 8-continued

| Parameter | Concentration μg/m$^3$ | EC2 μg/m$^3$ | EC1 μg/m$^3$ | EC1 Plus μg/m$^3$ |
|---|---|---|---|---|
| Total Carcinogens after 3 days | <1 | | ≤10 | |
| Total Carcinogens after 28 days | <1 | | ≤1 | |

* LCI: lowest concentration of interest

The results in table 8 indicate that with the anti-dust additive of tile adhesive composition E composed with hydrocarbon fluids mixed according to the invention and to one preferred embodiment, the concentration of total volatile organic compounds (TVOC) after 3 days or 28 days are extremely low. With 26 μg/m$^3$ of TVOC after 28 days the anti-dust additive composition has the best possible result corresponding to the EMICODE emission class EC1 Plus.

Table 9 indicates the evaluation of the emissions of volatile organic compounds (VOC) according to ISO 16000-3, ISO 16000-6, ISO 16000-9 and ISO 16000-11 of the Blue Angel RAL-UZ 113 certification requirements for the tile adhesive E which shows the best results in terms of mechanicals properties and dust reduction.

TABLE 9

| | Test after 3 days | | Test after 28 days | |
|---|---|---|---|---|
| Parameter | Concentration μg/m$^3$ | Limit value μg/m$^3$ | Concentration μg/m$^3$ | Limit value μg/m$^3$ |
| Total VOC | 200 | ≤1000 | 33 | ≤100 |
| Total semi VOC | <5 | — | <5 | ≤50 |
| R-value (dimensionless) | 0.054 | — | 0.0073 | ≤1 |
| Total VOC without LCI * | 7.1 | — | <5 | ≤40 |
| Total Carcinogens | <1 | ≤10 | <1 | ≤1 |
| Sum Formaldehyde + Acetaldehyde | <0.003 ppm | 0.05 ppm | — | — |

* LCI: lowest concentration of interest

The results in table 9 indicate that with the anti-dust additive composition of tile adhesive E formulated with hydrocarbon fluids mixed according to the invention and to one preferred embodiment, the concentration of volatile organic compounds (TVOC) after 3 days or 28 days are extremely low. With 33 μg/m$^3$ of TVOC after 28 days the anti-dust additive composition has the best possible result to comply with RAL UZ 113 for "Low-emission Floor Covering Adhesives and other Installation Materials".

The invention claimed is:

1. An anti-dust additive composition for industrial mortars, dry coatings, cements and/or tile adhesives, comprising at least a hydrocarbon fluid consisting of the combination of a hydrotreated hydrocracked hydrocarbon fluid with a hydrotreated hydrodewaxed hydrocarbon fluid,
wherein the anti-dust additive composition comprises
from 95% to 99% wt of the hydrocarbon fluid based on the total weight of the anti-dust additive composition,
from 0.01% to 0.5% wt of water based on the total weight of the anti-dust additive composition, and
from 0.5% to 4.99% wt of a surfactant based on the total weight of the anti-dust additive composition, wherein the surfactant is a mixture of triblock copolymers derived from ethylene oxide and propylene oxide, and fatty alcohol, and
wherein the hydrocarbon fluid has:
a naphthenics content below 50% wt based on the total weight of the hydrocarbon fluid;
an isoparaffinic content above 50% wt based on the total weight of the hydrocarbon fluid;
a normal paraffinic content below 20% wt based on the total weight of the hydrocarbon fluid; and
less than 0.1% wt of aromatics measured by UV spectrometry based on the total weight of the hydrocarbon fluid.

2. The anti-dust additive composition according to claim 1, wherein the hydrocarbon fluid is a dearomatised and/or desulfurized hydrocarbon fluid.

3. The anti-dust additive composition according to claim 1, wherein the hydrocarbon fluid is originated from crude oil.

4. The anti-dust additive composition according to claim 1, wherein the hydrocarbon fluid has a distillation range comprised between 230° C. and 410° C., according to ASTM D86.

5. The anti-dust additive composition according to claim 1, wherein the hydrocarbon fluid has a kinematic viscosity at 40° C. comprised between 2 mm$^2$/s and 22 mm$^2$/s, according to ASTM D445.

6. The anti-dust additive composition according to claim 1, wherein the hydrocarbon fluid has a paraffinic content above 60% wt based on the total weight of the hydrocarbon fluid.

7. A process of preparation of a construction material comprising:
adding an anti-dust additive composition for industrial mortars, dry coatings, cements and/or tile adhesives to a material powdery binder, the anti-dust additive composition comprising
at least a hydrocarbon fluid consisting of the combination of a hydrotreated hydrocracked hydrocarbon fluid with a hydrotreated hydrodewaxed hydrocarbon fluid,
from 0.5% to 4.99% wt of a surfactant based on a total weight of the anti-dust additive composition, wherein the surfactant is a mixture of triblock copolymers derived from ethylene oxide and propylene oxide, and fatty alcohol, and
from 0.01% to 0.5% wt of water based on the total weight of the anti-dust additive composition,
wherein the additive composition comprises 95% to 99% wt of the hydrocarbon fluid based on the total weight of the anti-dust additive composition, and
wherein the hydrocarbon fluid has:
a naphthenics content below 50% wt based on the total weight of the hydrocarbon fluid;
an isoparaffinic content above 50% wt based on the total weight of the hydrocarbon fluid;
a normal paraffinic content below 20% wt based on the total weight of the hydrocarbon fluid; and
less than 0.1% wt of aromatics measured by UV spectrometry based on the total weight of the hydrocarbon fluid.

8. The process according to claim 7, wherein the anti-dust additive composition is added by vaporisation on the material powdery binder.

9. The process according to claim 7, wherein the anti-dust additive composition is added by blending with the material powdery binder.

10. The process according to claim 7, wherein the construction material comprises between 0.01% and 10% wt of the anti-dust additive composition.

11. The anti-dust additive composition according to claim 1, wherein the anti-dust additive composition is configured to decrease dust emission from a material powdery binder during the fabrication of a construction material and/or from the construction material during use of the construction material.

12. The anti-dust additive composition according to claim 11, wherein the material powdery binder is selected from the group consisting of industrial mortars, dry coatings, cements and tile adhesives.

13. The anti-dust additive composition according to claim 1, wherein the anti-dust additive composition has a pour point according to ASTM D97 between −50° C. and 0° C.

14. The anti-dust additive composition according to claim 1, wherein the anti-dust additive composition is free of volatile organic compounds (VOCs).

\* \* \* \* \*